(12) United States Patent
Inutsuka

(10) Patent No.: US 9,842,589 B2
(45) Date of Patent: Dec. 12, 2017

(54) VOICE INPUT DEVICE, VOICE INPUT METHOD AND PROGRAM

(71) Applicant: NEC CASIO MOBILE COMMUNICATIONS, LTD., Kanagawa (JP)

(72) Inventor: Yusuke Inutsuka, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/381,279

(22) PCT Filed: Oct. 10, 2012

(86) PCT No.: PCT/JP2012/006476
§ 371 (c)(1),
(2) Date: Aug. 27, 2014

(87) PCT Pub. No.: WO2013/128508
PCT Pub. Date: Sep. 6, 2013

(65) Prior Publication Data
US 2015/0106098 A1    Apr. 16, 2015

(30) Foreign Application Priority Data
Feb. 27, 2012   (JP) .................. 2012-040133

(51) Int. Cl.
*G10L 15/08* (2006.01)
*G06F 3/16* (2006.01)
(Continued)

(52) U.S. Cl.
CPC ............ *G10L 15/083* (2013.01); *G06F 3/167* (2013.01); *G06K 9/00302* (2013.01);
(Continued)

(58) Field of Classification Search
None
See application file for complete search history.

(56) References Cited

U.S. PATENT DOCUMENTS

| 6,453,292 B2 | 9/2002 | Ramaswamy et al. |
| 6,697,777 B1 | 2/2004 | Ho et al. |

(Continued)

FOREIGN PATENT DOCUMENTS

| JP | 2000-020092 | 1/2000 |
| JP | 2000-132186 | 5/2000 |

(Continued)

OTHER PUBLICATIONS

Extended European Search Report dated Sep. 28, 2015; Application No. 12869934.5.
International Search Report, PCT/JP2012/006476, Jan. 15, 2013.

*Primary Examiner* — Richa Mishra
(74) *Attorney, Agent, or Firm* — Young & Thompson

(57) ABSTRACT

A voice input device provided with an input section for inputting a voice of a user, a recognition section for recognizing the voice of the user inputted by the input section, a generation section for generating characters or a command based on a recognition result of the recognition section, a detection section for detecting a device's own posture, and an instruction section for instructing the generation section to generate the command when a detection result of the detection section represents a specific posture as compared to instructing the generation section to generate the characters when the detection result of the detection section represents a posture other than the specific posture. Accordingly, character input and command input during dictation is correctly distinguished, or more specifically unexpected character input during dictation is avoided.

5 Claims, 3 Drawing Sheets

(51) Int. Cl.
*G06K 9/00* (2006.01)
*G10L 15/26* (2006.01)
*G06F 1/16* (2006.01)
*G10L 15/22* (2006.01)

(52) U.S. Cl.
CPC ............ *G10L 15/26* (2013.01); *G06F 1/1694* (2013.01); *G06K 9/00228* (2013.01); *G06K 9/00308* (2013.01); *G10L 2015/223* (2013.01); *G10L 2015/228* (2013.01)

(56) References Cited

U.S. PATENT DOCUMENTS

| | | | |
|---|---|---|---|
| 7,747,040 B2 | 6/2010 | Toyama | |
| 8,121,586 B2 | 2/2012 | Araradian et al. | |
| 8,165,886 B1 * | 4/2012 | Gagnon | G10L 15/19 704/275 |
| 2001/0056344 A1 | 12/2001 | Ramaswamy et al. | |
| 2006/0233422 A1 * | 10/2006 | Toyama | G06K 9/00228 382/103 |
| 2010/0069123 A1 * | 3/2010 | Araradian | G06F 1/1626 455/566 |
| 2010/0121636 A1 * | 5/2010 | Burke | G06F 3/0346 704/233 |
| 2011/0012926 A1 * | 1/2011 | Kerr | G06F 1/1626 345/649 |
| 2011/0191108 A1 * | 8/2011 | Friedlander | H04L 17/02 704/270.1 |
| 2011/0301950 A1 | 12/2011 | Ouchi et al. | |
| 2012/0265538 A1 * | 10/2012 | Gustafsson | G10L 21/16 704/275 |

FOREIGN PATENT DOCUMENTS

| | | |
|---|---|---|
| JP | 2000-267695 | 9/2000 |
| JP | 2001-306091 | 11/2001 |
| JP | 2002-278671 | 9/2002 |
| JP | 2003-044085 | 2/2003 |
| JP | 2004-093698 | 3/2004 |
| JP | 2010-085536 | 4/2010 |
| JP | 2010-217754 | 9/2010 |
| JP | 2010217754 A * | 9/2010 |

* cited by examiner

ND PROGRAM

VOICE INPUT DEVICE, VOICE INPUT METHOD AND PROGRAM

CROSS-REFERENCE TO RELATED APPLICATIONS

This is a national stage of International Application No. PCT/JP 2012/006476 filed Oct. 10, 2012, claiming priority based on Japanese Patent Application No. 2012-040133 filed Feb. 27, 2012, the entire contents of which are incorporated herein by reference.

TECHNICAL FIELD

The present invention relates to a voice input device, a voice input method and a program, more particularly, relates to a voice input device, a voice input method and a program, which performs voice recognition of dictation content (dictation: stated orally) and performs character input.

BACKGROUND ART

In recent years, following the improved efficiency of a mobile type terminal device (hereinafter, simply referred to as a mobile terminal) such as a cellular phone device, an environment where highly efficient applications can be performed on a terminal has developed. One of these applications is an application for dictation which performs voice recognition of dictation content and performs character input by only stating (dictating) text in voice (for example, see Patent Documents 1 to 6 described below). Such dictation input (character input by voice recognition) is especially effective in a mobile terminal. This is because the input device of a mobile terminal is only equipped with a device having mediocre operating efficiency, such as a touch panel. When the above-described application is installed, character input of dictation content can directly carried out, and it is not necessary to use an input device such as the touch panel having mediocre operating efficiency.

PRIOR ART DOCUMENTS

Patent Documents

Patent Document 1: JP 2010-085536
Patent Document 2: JP 2004-093698
Patent Document 3: JP 2001-306091
Patent Document 4: JP 2003-044085
Patent Document 5: JP 2000-132186
Patent Document 6: JP 2000-020092

SUMMARY OF INVENTION

Problem to be Solved by the Invention

However, the technologies of the above-described Patent Documents 1 to 6 have a first problem in that character input and command input during the dictation cannot be correctly distinguished, and a second problem in that unexpected character input is performed when a user is spoken to by a nearby person during the dictation.

(1) The first problem will be described.

When a sentence is inputted by dictation, it may be necessary to input a command corresponding to the structure of the sentence. For example, command input such as a new line, or command input such as character deletion, cursor movement to an arbitrary position, and character insertion are exemplified. It is possible to carry out the command input with voice (Patent Document 4 and Patent Document 5). However, for example, even when "NEW LINE" is vocalized, it cannot be distinguished whether it is provided for character input or command input. In order to distinguish them, there has been provided a technology (Patent Document 6) in which, when vocalization is not provided for a constant period of time, command input mode is switched. However, attention needs to be paid to the timing of vocalization, whereby poor usability is provided. Also, a method is conceivable in which, when vocalization is provided with a specific key or button pressed, the vocalization is interpreted as the command input. However, this method requires the operation of keys or buttons and causes the deterioration of operability, whereby the method is not favorable. Accordingly, it is required to correctly distinguish the character input from the command input during the dictation without incurring the deterioration of usability and operability.

(2) The second problem will be described.

For example, when dictation is carried out at a workplace or the like, a user may often be spoken to by a nearby person during the dictation. In this case, a system erroneously recognizes the vocalization of the nearby person as the dictation, thereby leading to unexpected character input. When the unexpected character input is made, the processing of character correction needs to be retroactively executed (Patent Document 2 and Patent Document 3), and, during that time, the dictation needs to be interrupted, whereby the continuity of thought regarding the sentence cannot be kept. This is because unexpected character input is carried out in the first place. Accordingly, it is also required to avoid the unexpected character input during the dictation.

Accordingly, an object of the present invention is to provide a voice input device, a voice input method, and a program, which can correctly distinguish character input from command input during dictation or more specifically unexpected character input during dictation can be avoided.

Means for Solving the Problem

A voice input device comprising: an input section for inputting a voice of a user; a recognition section for recognizing the voice of the user inputted by the input section; a generation section for generating characters or a command based on a recognition result of the recognition section; a detection section for detecting the device's own posture; and an instruction section for instructing the generation section to generate the command when a detection result of the detection section represents a specific posture as compared to instructing the generation section to generate the characters when the detection result of the detection section represents a posture other than the specific posture.

A voice input method comprising: an input step of inputting a voice of a user; a recognition step of recognizing the voice of the user inputted in the input step; a generation step of generating characters or a command based on a recognition result of the recognition step; a detection step of detecting a device's own posture; and an instruction step of instructing the generation step to generate the command when a detection result of the detection step represents a specific posture as compared to instructing the generation step to generate the characters when the detection result of the detection step represents a posture other than the specific posture.

A non-transitory computer-readable storage medium having a program stored thereon that is executable by a computer of a voice input device to perform functions comprising: an input section for inputting a voice of a user; a recognition section for recognizing the voice of the user inputted by the input section; a generation section for generating characters or a command based on a recognition result of the recognition section; a detection section for detecting a device's own posture; and an instruction section for instructing the generation section to generate the command when a detection result of the detection section represents a specific posture as compared to instructing the generation section to generate the characters when the detection result of the detection section represents a posture other than the specific posture.

Effect of the Invention

According to the present invention, character input and command input during dictation can be correctly distinguished, or more specifically unexpected character input during the dictation can be avoided.

DESCRIPTION OF EMBODIMENTS

Hereinafter, the embodiment of the present invention will be described referring to drawings.

First, a structure will be described.

Figure 1:
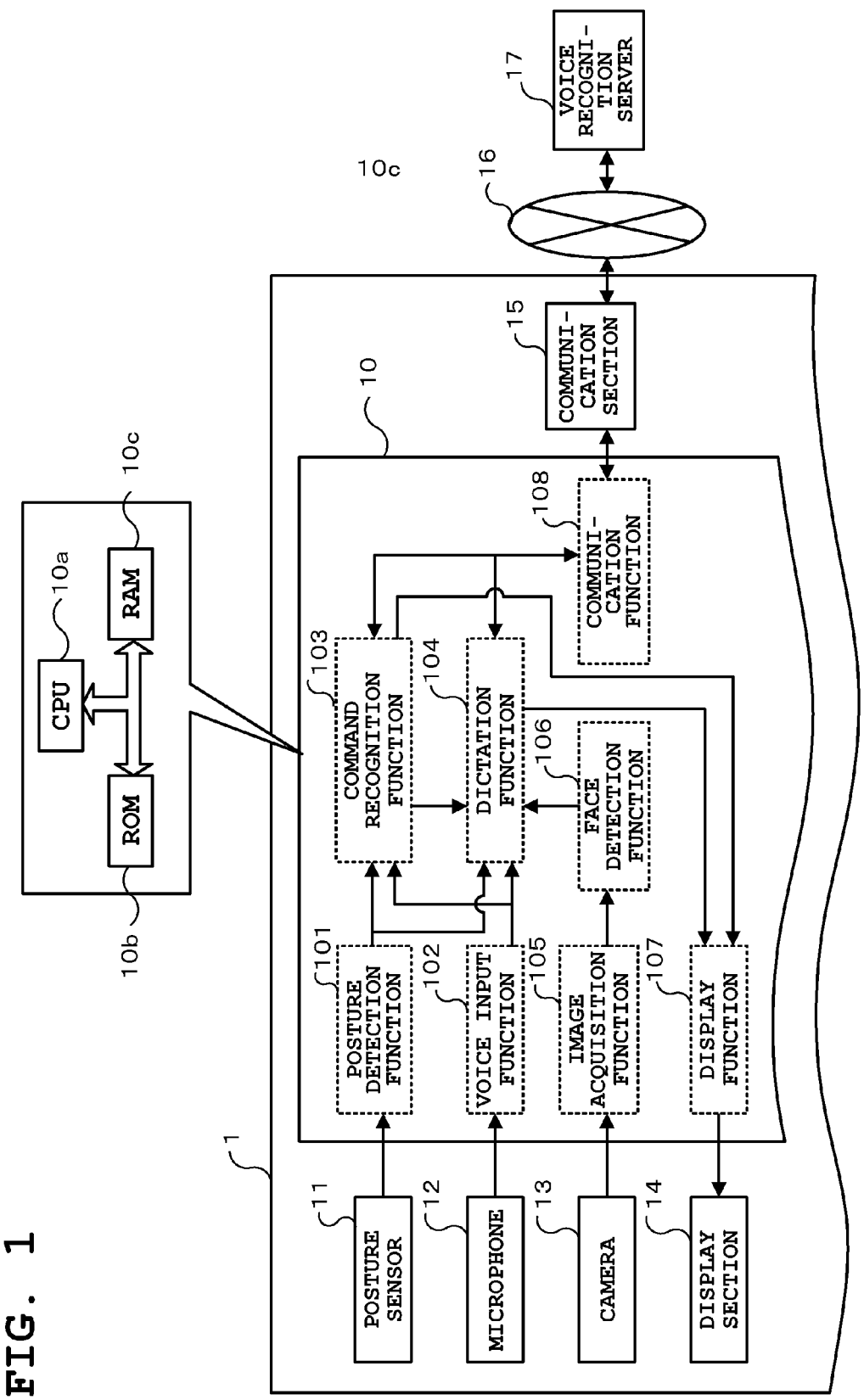
FIG. 1 is a diagram of the structure of a voice input device 1 according to an embodiment.

FIG. 1 is a diagram of the structure of a voice input device 1 according to the embodiment. In the diagram, the voice input device 1 includes at least a central control section 10, a posture sensor 11, a microphone 12, a camera 13, a display section 14 and a communication section 15. Note that, besides these, a power source section that includes a battery and the like are included, but omitted in order to avoid convergence in the diagram.

The posture sensor 11 detects the posture of the voice input device 1 itself, that is, the device's own posture and outputs an electric signal, indicating of the result of the detection, to the central control section 10. For example, a three-axis acceleration sensor, an inclination sensor, or a gyro sensor can be used for the posture sensor 11. The microphone 12 takes in the voice of a user (an operator of the voice input device 1), converts the voice into an electric signal, and outputs the electric signal to the central control section 10. The display section 14 is a flat display device (liquid crystal panel, EL panel and the like) equipped with a touch screen. The camera 13 captures at least the moving images or periodical still images (also referred to as continuous images) of the face of the user who watches the display section 14 and outputs its imaging data to the central control section 10. The communication section 15 accesses a voice recognition server 17 provided in a network such as the Internet, as required, by using arbitrary communication media, for example, wireless circuits or such as cellular phones and WiFi, or wired circuits such as general public circuits optical cables or ADSL.

The central control section 10 is a general purpose program control element constituted by a computer (CPU) 10a, a non-volatile semiconductor memory (ROM) 10b for program storage, a high-speed semiconductor memory (RAM) 10c for program execution, and a peripheral circuits (input-and-output section and the like) not illustrated. The central control section 10 loads a control program (basic programs, application programs, and various data required for these programs), which is written in the ROM 10b to the RAM 10c and executes the control program by means of the CPU 10a, thereby realizing a function corresponding to the content of the control program, that is, various functions required for the operation of the voice input device 1.

The above-mentioned "functions" refer to operations, motions, or mechanisms virtually achieved by organically connecting a hardware resource such as such as the CPU 10a and a software resource such as the control program in the central control section 10. The function does not involve material substance (form).

For example, the functions realized by the central control section 10 of the embodiment are exemplified by a posture detection function 101, a voice input function 102, a command recognition function 103, a dictation function 104, an image acquisition function 105, a face detection function 106, a display function 107, and a communication function 108. As described above, these functions do not involve material substance (form), but are not limited to this aspect (function which does not involve material substance). Regarding the concept of the present invention, part or whole of the respective functions described above may be constituted by "one in which material substance is involved", that is, hard logic and the like.

In comprehensive view, firstly, the respective functions illustrated provide the voice input device 1 with dictation, that is, a mechanism in which voice recognition is performed for the content dictated by a user, and character input is performed. Herein, "character input" means display in a state where characters are recognizable on a screen of the display section 14, and temporal storage in the RAM 10c and the like in a state where the characters are compilable as coded character string information, simultaneously with the display.

Secondly, the respective functions illustrated provide a mechanism in which it is correctly distinguished whether the content dictated by the user is provided for character input or command input (mechanism for solving the first problem described at the beginning of the specification). Note that, in the embodiment, "command" is used for the two purposes of ordinary use and compiling use. An ordinary command is a command which prompts the voice input device 1 to perform any operation, and for example, serves as a command with which the telephone function is turned ON in a case where the voice input device 1 is also used as a cellular phone device (voice command such as "TELEPHONE"). Furthermore, in the embodiment, a dictation operation is turned ON/OFF with the ordinary command. For example, in order that the dictation operation is turned ON, "DICTATION ON" is vocalized, and in order that the dictation operation is turned OFF, "DICTATION OFF" is vocalized.

The point in the mechanism, in which it is correctly distinguished whether the content dictated by a user is provided for character input or command input, lies in that distinction is performed based on "posture" of the voice input device 1. For example, when the voice input device 1 is in a "specific posture", the content dictated by the user is distinguished as command input, otherwise, the content dictated by the user is distinguished as character input.

As specific postures, various postures are conceivable. For example, when the general posture of the voice input device 1, in which dictation is performed for the purpose of character input, is taken as a standard posture, a posture deviated from the standard posture may be provided as a "specific posture". Also, postures may be interpreted based on motions. For example, the "specific posture" may include a motion such as shaking the voice input device 1. Note that, "deviated" means that the change of the posture is made equal to or larger than a predetermined magnitude (threshold value).

The typical example of the general posture, in which dictation is performed for the purpose of character input, is a posture in which the voice input device 1 is standing. Specifically, the posture is a posture in which the screen of the display section 14 is parallel to the direction of gravity, or a posture in which the screen of the display section 14 is at an angle close to the parallel direction. This is because, when dictation is performed for the purpose of character input, many users place the screen of the display section 14 in front of the their faces with the screen standing vertically or placed at an angle close to the vertical and vocalize into the microphone 12 while watching the display of the screen. Accordingly, in this case, the posture in which the voice input device 1 is not standing is provided as the above-described "specific posture", and vocalization in the specific posture is distinguished as the command input, whereas vocalization in a posture other than the specific posture, that is, in the posture in which the voice input device 1 is standing is distinguished as the character input.

Needless to say, the "specific posture" is not limited to the exemplification. For example, an opposite way of the exemplification may be provided. That is, the posture in which the voice input device 1 is standing may be provided as the above-described "specific posture", and whereby vocalization in the specific posture is distinguished as the command input, whereas vocalization in a posture other than the specific posture, that is, in the posture in which the voice input device 1 is not standing is distinguished as the character input. Moreover, a posture in which the voice input device 1 is inclined right and left or swung in front and behind may be provided as a "specific posture". Furthermore, the "specific posture" may be arbitrarily designated by users. For example, it may be such that an item "settings of a posture for command recognition" is provided in a system menu, and a message such as "Please keep your voice input device in a desired posture and press an enter button", for example, is displayed on the screen of the display section 14 when a user selects the item, and the posture taken when the enter button is pressed is stored as the above-described "specific posture" in the system.

Thirdly, the respective functions illustrated provide a mechanism for avoiding unexpected character input performed when a user is spoken to by a nearby person during dictation (character recognition is performed for the vocalization of the nearby person) (mechanism for solving the second problem described at the beginning of the specification). The point of the mechanism lies in that the continuation and temporal interruption of dictation can be appropriately switched in accordance with whether or not the face of the user is directed to the screen of the display section 14 based on a fact that an original speaker (user of the voice input device 1 who takes dictation) places the screen of the display section 14 in front of the user's face during the dictation for the purpose of character input and vocalizes while watching the display on the screen, that is, based on the fact that the face of the user is always directed to the screen of the display section 14 during dictation.

Specific description will be provided. When the user during the dictation is not spoken to by a nearby person, the user vocalizes while keeping the user's eyes on the screen of the display section 14. In this time, the face of the user is correctly directed toward the screen of the display section 14, and the front surface of the face is detected by the camera 13. On the other hand, when spoken to by a nearby person, many users direct their faces or eyes to the direction of the person, and a user's face seen from the side or the face in which the user's eyes are averted is detected by the camera 13. Thus, the states of the face detected by the camera 13 differ between a case where the user is spoken to by the nearby person during dictation and a case to the contrary. Accordingly, when the state of the face detected by the camera 13 is the former (front surface of face), the dictation is continued, and when the state of the face is the latter (a face seen from the side or a face in which eyes are averted), the dictation is temporarily interrupted, whereby unexpected character input during the dictation can be avoided.

Fourthly, the respective functions illustrated provide a mechanism for achieving the reduction in processing load of dictation or the improvement of accuracy of dictation (communication function 108 and the like). The mechanism is effective, in particular, for the case of a mobile-type voice input device 1 (for example, a cellular phone device). Generally, dictation requires large processing capacity, but the processing capacity of the mobile-type voice input device 1 is considerably low compared with the processing capacity of a stationary-type, high-performance information processing device. Accordingly, by applying the above-described mechanism, practical dictation can be sufficiently performed even when the processing capacity is low.

Moreover, the dictation requires a large amount of vocabulary data, and the vocabulary data is changed in an ever-progressing manner. If the vocabulary data is included inside the voice input device 1, its storage capacity may be strained, and further, it is troublesome to update and manage the vocabulary data. However, the fourth mechanism is applied, so that the inconvenience (strain of the storage capacity and trouble of updating and managing the vocabulary data) can be avoided.

However, the fourth mechanism is required in view of practicality. It may be judged whether or not the fourth mechanism should be implemented in consideration of the processing capacity of the voice input device 1, the storage capacity, the presence or absence of necessity of update and management, and the like.

Thus, in comprehensive view, the respective functions described above provide the four mechanisms (first to fourth mechanisms). Herein, the specific role of the respective functions and the like will be described.

The posture detection function 101 takes in a signal from the posture sensor 11, detects what state is presently adopted as the posture of the voice input device 1, based on the signal, and outputs the detection result to the command recognition function 103 or the dictation function 104. The voice input function 102 takes in a signal from the microphone 12 and outputs the signal to the command recognition function 103 or the dictation function 104. The image acquisition function 105 takes in a signal (image data captured as the moving images or periodical still images of the face of the user who watches the display section 14) from the camera 13 and outputs the signal to the face detection function 106. The face detection function 106 detects the face of the user from the image data, and judges whether or not the face of the user is correctly directed toward the screen of the display section 14.

The command recognition function 103 recognizes whether voice during dictation is associated with character input or command input, based on the signal from the posture detection function 101 and the signal from the voice input function 102, and outputs the recognition result to the dictation function 104 and a display function 107. The dictation function 104 executes dictation based on the signal from the voice input function 102, and when the command input is recognized by the command recognition function 103, the dictation function 104 interprets the character input during the dictation as command input, or when the face of the user is not detected by the face detection function 106, or when the face of the user is detected, but the face of the user is not correctly directed toward the screen of the display section 14, the dictation function 104 temporarily interrupts the dictation. The display function 107 formats and converts the output from the command recognition function 103 and the output from the dictation function 104 into a predetermined display form, and displays it on the display section 14. The communication function 108 accesses the voice recognition server 17 provided the network 16 such as the Internet via the communication section 15, as required.

Next, working will be described.

Figure 2:
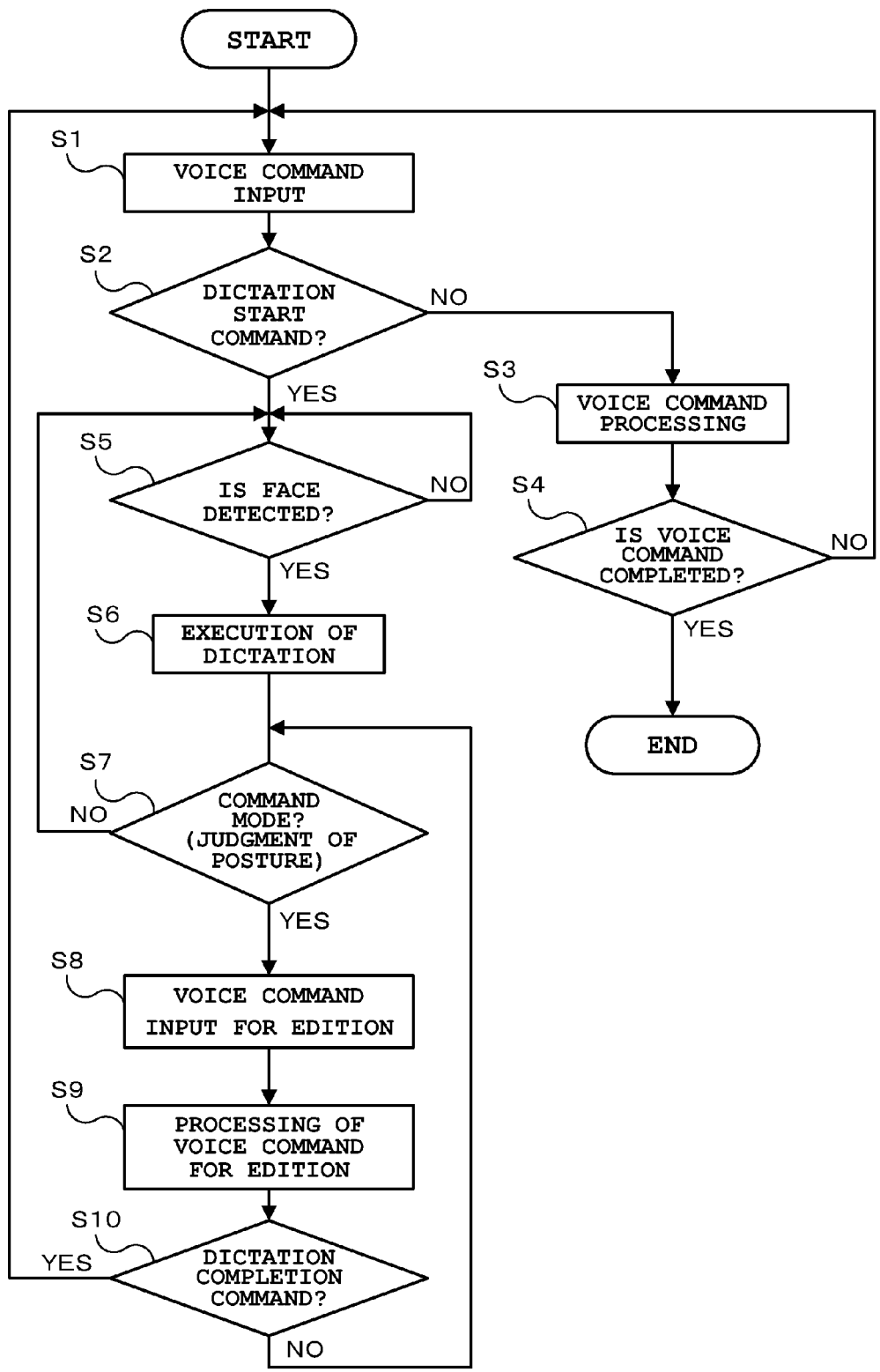
FIG. 2 is a diagram illustrating a flow of operations of the voice input device 1 according to the embodiment.

FIG. 2 is a diagram illustrating a flow of operations of the voice input device 1 according to the embodiment. The flow of operations represents the main part of a flow of operations of a control program executed by the CPU 10a of the central control section 10. Accordingly, the execution entity of each processing below (Step S1 to Step S10) in the flow of operations is the CPU 10a of the central control section 10.

When the flow of operations starts, the CPU 10a first detects command input, which is performed by a user and for which voice is used (Step S1). Elements associated with the detection are the microphone 12, the voice input function 102, and the command recognition function 103.

Next, the CPU 10a judges whether or not the command detected at Step S1 is a dictation start command (Step S2). For example, when the command detected at Step S1 is "DICTATION ON", the CPU 10a may judge that the detected command is the dictation start command.

In this case, a command other than "DICTATION ON" is the former out of the commands of two types (ordinary command and compilation command) described above, for example, which is exemplified by a command (voice command such as "TELEPHONE") used for turning on a telephone function in a case where the voice input device 1 also serves as the cellular phone device.

Accordingly, in the case of the voice command such as "TELEPHONE", the judgment result is NO at Step S2, the CPU 10a executes processing corresponding to the ordinary command (Step S3), and the CPU 10a judges whether the voice command is completed (Step S4), and when the voice command is completed, the flow is finished as it is. In contrast, when the voice command is not completed, the flow returns to Step S1 again.

When the judgment result at Step S2 is YES, that is, when the command detected at Step S1 is "DICTATION ON", subsequently, the CPU 10a detects the face of the user by using the third mechanism, and judges whether or not the face is in a predetermined state (state where the face is correctly directed toward the display section 14) (Step S5). As described above, there is a fact that the user of the voice input device 1 who performs dictation, during that time, places the screen of the display section 14 in front of the user's face and vocalizes while watching the display on the screen. That is, there is a fact that the face of the user is always directed to the screen of the display section 14 during the dictation, so that, when the judgment result at Step S5 is YES, the CPU 10a performs the dictation (Step S6).

In contrast, the judgment result at Step S5 is NO, that is, when the user is spoken to by a nearby person during the dictation, and the face of the user is changed from the state where the face is correctly directed to a state where the face is turned sideways from the front, or a state where the eyes are averted, during that time, there is a possibility that unexpected character input is performed due to vocalization of the nearby person. Accordingly, Step S5 is looped, and the dictation at Step S6 is prevented from being performed (temporarily stopped).

Thus, the dictation is temporarily stopped based on the detection result regarding the face of the user by using the third mechanism, unexpected character input (character recognition is applied to the vocalization of the nearby person) can be avoided when the user is spoken to by a nearby person during the dictation (the second problem described at the beginning of the specification can be solved). Then, while the face of the user is detected in a predetermined state (state where the face of the user is correctly directed toward the display section 14), the dictation can be performed without trouble.

Subsequently, after performing the dictation, the CPU 10a judges whether or not a command mode is provided, by using the second mechanism (Step S7). The command mode is a mode used for the latter command, out of the commands of two types (ordinary command and compilation command) described above. For example, the mode is used for a new line command, a character deletion command, a cursor movement command, which is used to move a cursor to an arbitrary position, and a character insertion command.

Elements associated with the judgment are the posture sensor 11, the posture detection function 101, and the command recognition function 103. In the judgment, the CPU 10a judges whether or not the voice input device 1 is in the "specific posture", and if the voice input device 1 is in the "specific posture", the CPU 10a distinguishes the command input, and otherwise distinguishes character input. Accordingly, it can be correctly distinguished whether the content dictated by a user is provided for the character input or the command input (the first problem described at the beginning of the specification can be solved).

When the judgment result at Step S7 is NO, that is, when the voice input device 1 is not in the "specific posture", the CPU 10a judges that the content dictated by the user is provided for the character input, and repeats Step S5 onward. In contrast, when the judgment result at Step S7 is YES, that is, when the voice input device 1 is in the "specific posture", the CPU 10a judges that the content dictated by the user is provided for the command input. After executing importation of a voice command (compilation command) by the user (Step S8) and the processing corresponding to the compilation command (for example, new line processing) (Step S9), the CPU 10a repeatedly executes Step S7 to Step S10 until a dictation completion command (for example, "DICTATION OFF") is detected (until the judgment result at Step S10 is YES), and when the dictation completion command is detected (when the judgment result at Step S10 is YES), the flow returns to Step S1.

As described above, according to the present embodiment, the following first and second effects can be acquired.

(First Effect) While the face of the user is detected in a predetermined state (state where the face of the user is correctly directed toward the display section 14), the dictation is performed (Step S6), and in contrast when the face of the user is not detected in the predetermined state, the dictation is temporarily stopped (Step S5 is looped). Accordingly, unexpected character input (character recognition is performed for the vocalization of the nearby person) can be avoided when the user is spoken to by a nearby person during the dictation, and the second problem described at the beginning of the specification can be solved.

(Second Effect) After the dictation is performed, the posture of the voice input device 1 is detected, and when the posture corresponds to a "specific posture", the content dictated by a user command is judged as command input, and when the posture does not correspond to the "specific posture", the content dictated by the user command is judged as ordinary character input (Step S7). Accordingly, it can be correctly distinguished whether the content dictated by the user is provided for the character input or the command input, and the first problem described at the beginning of the specification can be solved.

Moreover, according to the present embodiment, the following third effect can be acquired.

(Third Effect) As described above, the present embodiment provides a mechanism (fourth mechanism) for achieving the reduction in processing load of dictation or the improvement of accuracy of dictation. The main elements associated with the mechanism are the communication function 108 and the communication section 15 which operates in cooperation with the communication function 108. These elements can access the voice recognition server 17 provided in the outside (network 16 such as the Internet) as required. The whole or part of the dictation is executed by the voice recognition server 17, and further, the vocabulary data required for the execution of the dictation is stored in the voice recognition server 17, so that the processing load and the strain of the storage capacity of the mobile-type voice input device 1, whose processing capacity is low, can be prevented, and troublesome update and management of the vocabulary data can be avoided.

Note that, in the description above, the relation between the voice input device 1 and the voice recognition server 17 is not clarified. This is because any of use as a client-server type or use as a stand-alone type may be adopted. The use as the client-server type is a method in which the voice input device 1 is provided as a client, and the voice recognition server 17 is provided as a server, and both are associated with each other. Also, The use as the stand-alone type is a method in which the whole is completed inside the voice input device 1.

In the case of the client-server type, the whole or part of the command recognition function 103 and the dictation function 104 of the voice input device 1 is implemented in the voice recognition server 17. Also, in the case of the stand-alone type, needless to say, the voice recognition server 17 is unnecessary, and the communication function 108 and the communication section 15 of the voice input device 1 are also unnecessary.

Which use to adopt depends mainly on the specification requirements of a system. When the reduction in processing load of dictation or the improvement of accuracy of dictation is intended, the client-server type may be adopted. When the specification having no communication environment such as networks is applied, the stand-alone type may be adopted.

Also, in the description above, the cellular phone device has been exemplified as the example of the voice input device 1 but are not limited thereto. Any can be applied as along as voice input is required. For example, the present invention may be applied to electronic devices such as tablet terminals, personal computers, game machines, and various OA equipment, or industrial equipment such as robots and machine tools, or vehicles such as automobiles, aircrafts, and ships.

Hereinafter, the characteristics of the present invention will be described in Supplementary Notes.

Although some or all of the above embodiments may be described such as the following Summary Notes, they are not limited to the following:

(Supplementary Note 1)

Figure 3:
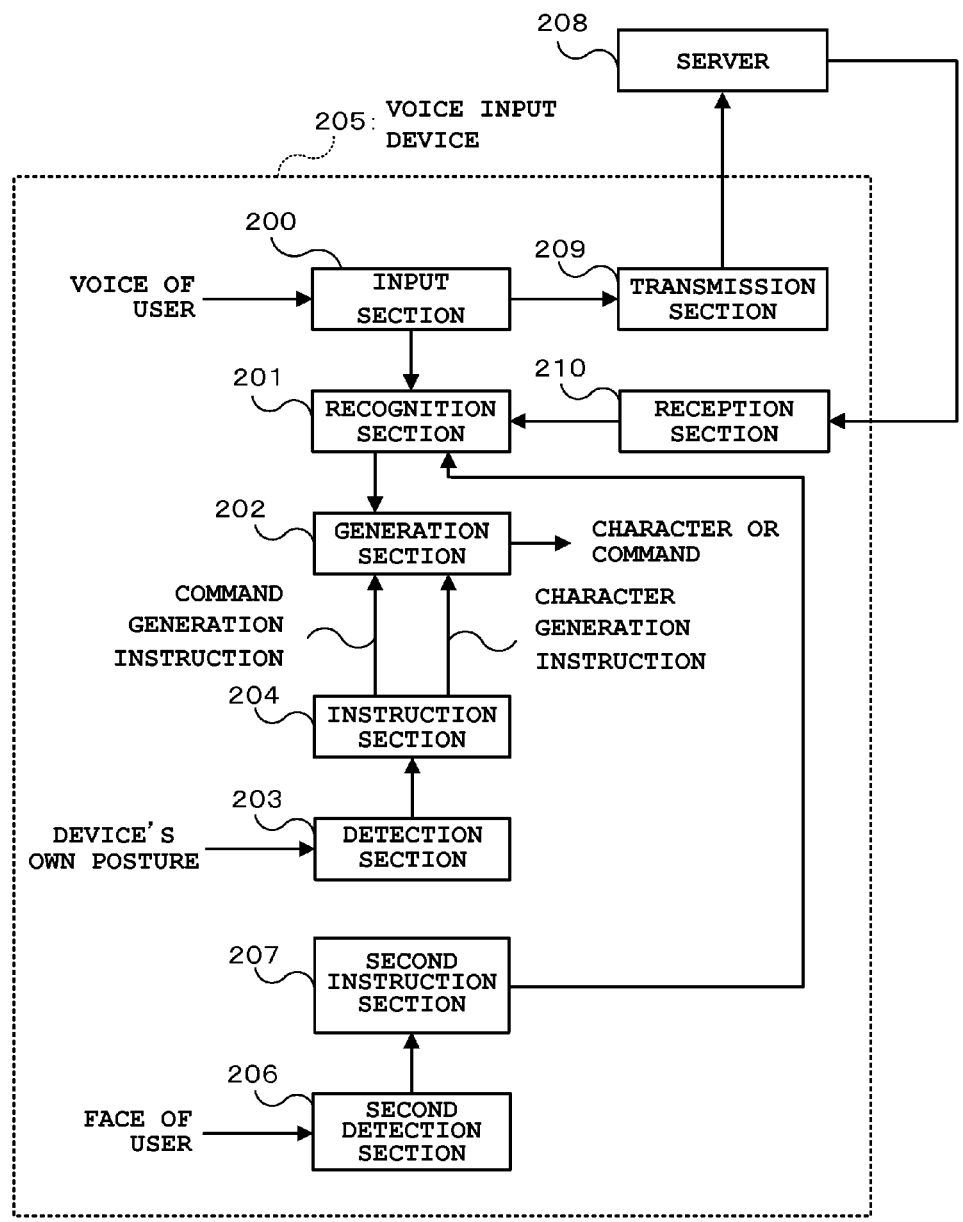
FIG. 3 is a diagram of the structure of Supplementary Notes 1, 2, and 3.

FIG. 3 is a diagram of the structure of Supplementary Notes 1, 2 and 3.

A voice input device 205 (corresponding to the voice input device 1 of the embodiment) according to the Supplementary Note 1 comprises: an input section 200 (corresponding to the voice input function 102 of the embodiment) for inputting a voice of a user; a recognition section 201 (corresponding to the dictation function 104 of the embodiment) for recognizing the voice of the user inputted by the input section 200; a generation section 202 (corresponding to the command recognition function 103 and the dictation function 104 of the embodiment) for generating characters or a command based on a recognition result of the recognition section 201; a detection section 203 (corresponding to the posture detection function 101 of the embodiment) for detecting the device's own posture; and an instruction section 204 (corresponding to the posture detection function 101 of the embodiment) for instructing the generation section 202 to generate the command when a detection result of the detection section 203 represents a specific posture as compared to instructing the generation section 202 to generate the characters when the detection result of the detection section 203 represents a posture other than the specific posture.

(Supplementary Note 2)

The voice input device according to the Supplementary Note further comprises: a second detection section 206 (corresponding to the face detection function 106 of the embodiment) for detecting a face of the user; and a second instruction section 207 (corresponding to the face detection function 106 of the embodiment) for instructing the recognition section 201 to stop a recognition operation when a state of the user's face detected by the second detection section 206 is in a predetermined state.

(Supplementary Note 3)

The voice input device according to the Supplementary Note 1 further comprises: a transmission section 209 (corresponding to the communication function 108 of the embodiment) for transmitting the user's voice inputted by the input section 200 to an external server 208 (corresponding to the voice recognition server 17 of the embodiment); and a reception section 210 (corresponding to the communication function 108 of the embodiment) for receiving a voice recognition result which is returned from the server 208.

(Supplementary Note 4)

A voice input method according to the Supplementary Note 4 comprises an input step of inputting a voice of a user; a recognition step of recognizing the voice of the user inputted in the input step; a generation step of generating characters or a command based on a recognition result of the recognition step; a detection step of detecting a device's own posture; and an instruction step of instructing the generation step to generate the command when a detection result of the detection step represents a specific posture as compared to instructing the generation step to generate the characters when the detection result of the detection step represents a posture other than the specific posture.

(Supplementary Note 5)

According to the Supplementary Note 5, there is provided a non-transitory computer-readable storage medium having a program stored thereon that is executable by a computer of a voice input device to perform functions comprising: an input section for inputting a voice of a user; a recognition section for recognizing the voice of the user inputted by the input section; a generation section for generating characters or a command based on a recognition result of the recognition section; a detection section for detecting a device's own posture; and an instruction section for instructing the generation section to generate the command when a detection result of the detection section represents a specific posture as compared to instructing the generation section to generate the characters when the detection result of the detection section represents a posture other than the specific posture.

DESCRIPTION OF REFERENCE NUMERALS

200 INPUT SECTION
201 RECOGNITION SECTION
202 GENERATION SECTION
203 DETECTION SECTION
204 INSTRUCTION SECTION
205 VOICE INPUT DEVICE
206 SECOND DETECTION SECTION
207 SECOND INSTRUCTION SECTION
208 SERVER
209 TRANSMISSION SECTION
210 RECEPTION SECTION

The invention claimed is:

1. A voice input device comprising:
an input device configured to receive as input a voice of a user; and
one or more processors configured to:
  recognize the voice of the user input to the input device,
  activate an application for dictation when it is determined that a dictation start command is detected from a voice recognition result,
  detect a posture of the device while the application for dictation is being activated, and
  when a voice has been recognized while a first posture is being detected, generate, for the application for dictation, a compilation command associated with the recognized voice, the compilation command being a command corresponding to the structure of a sentence, and
  when a voice has been recognized while a second posture is being detected, generate, for the application for dictation, the recognized voice, as characters,
wherein the one or more processors is further configured to set in advance an arbitrary posture designated by a user as one or more of the first posture and the second posture, and
wherein each of the postures is the device's own orientation.

2. The voice input device according to claim 1, wherein the one or more processors are further configured to:
  detect a face of the user, and
  stop a recognition operation when a state of the detected user's face is in a predetermined state.

3. The voice input device according to claim 1, further comprising:
a transmitter configured to transmit the user's voice inputted by the input section to an external server; and
a receiver configured to receive a voice recognition result returned from the server.

4. A voice input method comprising:
inputting a voice of a user;
recognizing the input voice of the user;
activating an application for dictation when it is determined that a dictation start command is detected from a voice recognition result;
detecting a posture of the device while the application for dictation is being activated; and
when a voice has been recognized while a first posture is being detected, generating, for the application for dictation, a compilation command associated with the recognized voice, the compilation command being a command corresponding to the structure of a sentence, and
when a voice has been recognized while a second posture is being detected, generating, for the application for dictation, the recognized voice, as characters,
wherein an arbitrary posture designated by a user is set in advance as one or more of the first posture and the second posture, and
wherein each of the postures is the device's own orientation.

5. A non-transitory computer-readable storage medium having a program stored thereon that is executable by a computer of a voice input device to perform the method comprising:
inputting a voice of a user;
recognizing the input voice of the user;
activating an application for dictation when it is determined that a dictation start command is detected from a voice recognition result;
detecting a posture of the device while the application for dictation is being activated; and
when a voice has been recognized while a first posture is being detected, generating, for the application for dictation, a compilation command associated with the recognized voice, the compilation command being a command corresponding to the structure of a sentence, and
when a voice has been recognized while a second posture is being detected, generating, for the application for dictation, the recognized voice, as characters,
wherein an arbitrary posture designated by a user is set in advance as one or more of the first posture and the second posture, and
wherein each of the postures is the device's own orientation.

* * * * *